United States Patent
Kataoka

(10) Patent No.: US 6,784,915 B2
(45) Date of Patent: Aug. 31, 2004

(54) LASER IMAGER HAVING REDUCED INTERFERENCE BETWEEN INTERNAL OPTICAL REFLECTIONS

(75) Inventor: Yoshikazu Kataoka, Kyoto (JP)

(73) Assignee: Dainippon Screen Mfg. Co., Ltd., Kyoto (JP)

(*) Notice: Subject to any disclaimer, the term of this patent is extended or adjusted under 35 U.S.C. 154(b) by 385 days.

(21) Appl. No.: 09/939,625

(22) Filed: Aug. 28, 2001

(65) Prior Publication Data

US 2002/0028079 A1 Mar. 7, 2002

(30) Foreign Application Priority Data

Aug. 28, 2000 (JP) .................................... P2000-256737

(51) Int. Cl.⁷ ................................................ B41J 2/47
(52) U.S. Cl. ...................................... 347/255; 347/239
(58) Field of Search .............................. 347/239, 241, 347/255, 256, 240, 258; 385/10; 359/627

(56) References Cited

U.S. PATENT DOCUMENTS 5,802,034 A    9/1998  Gelbart ...................... 369/102
5,982,553 A *  11/1999 Bloom et al. ................ 359/627
6,084,626 A *  7/2000  Ramanujan et al. ......... 347/239
6,229,650 B1   5/2001  Reznichenko et al. ....... 359/566

FOREIGN PATENT DOCUMENTS

JP    2000-131628    12/2000

* cited by examiner

Primary Examiner—Hai Pham
(74) Attorney, Agent, or Firm—McDermott Will & Emery LLP

(57) ABSTRACT

A laser beam emitted from a laser light source passes through an illumination lens and is thereafter incident upon a total internal reflection prism. The total internal reflection prism bends the laser beam, which is applied to a Grating Light Valve™. The laser beam divided into a number of beams and modulated by the light valve is incident upon a focusing lens. The normal to the light valve forms an angle θxz with the optical axis of an illumination optical system including the total internal reflection prism and an illumination lens. The normal to the light valve also forms the angle θxz with the optical axis of a focusing optical system.

11 Claims, 10 Drawing Sheets

F I G . 1 1 A
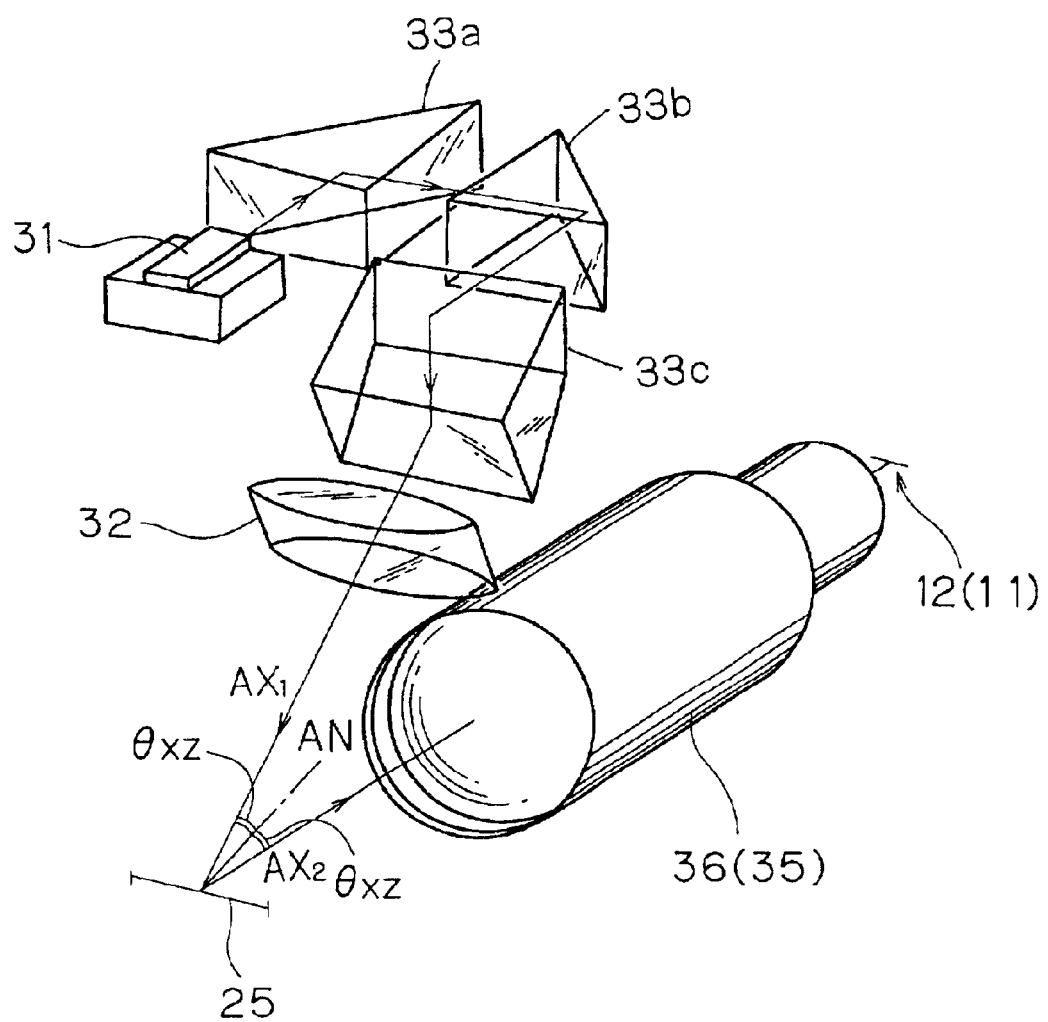

LASER IMAGER HAVING REDUCED INTERFERENCE BETWEEN INTERNAL OPTICAL REFLECTIONS

BACKGROUND OF THE INVENTION

1. Field of the Invention

The present invention relates to a laser imager employing a linear reflective spatial light modulator.

2. Description of the Background Art

A Grating Light Valve™ (GLV™) is known as a reflection type spatial light modulator employed for a laser imager.

The GLV™, which is manufactured by Silicon Light Machine, CA, is constructed such that thousands of narrow reflectors (ribbons) laterally arranged in parallel with each other are activated by electric force, thereby modulating a light beam through diffraction caused by the ribbons.

When such a reflective spatial light modulator as the GLV™ is employed, a light beam applied thereto can be divided into a number of light beams to be individually modulated.

Like other spatial light modulators, the GLV™ has a glass window a small distance away from the ribbon surface. This structure may cause etalon fringes when a laser beam is applied.

SUMMARY OF THE INVENTION

The present invention is directed to a laser imager for recording an image on an image recording medium.

According to an aspect of the present invention, the laser imager comprises a) a laser light source emitting a first laser beam, b) a first optical system converting the first laser beam to a second laser beam, c) a Grating Light Valve™ comprising reflecting members and a window placed a small distance away from the reflecting members and d) a second optical system comprising a focusing lens for focusing a signal beam modulated by the light valve on the image recording medium. The first optical system comprises a bending element bending the first laser beam to convert the first beam to the second beam, and the normal to the light valve forms a nonzero angle θxz with the second beam.

In a preferred embodiment of this aspect, the first optical system further comprises a lens for leading the first beam to the bending element.

Preferably, the angle θxz should be between 4° and 20° and the bending element should comprise a total internal reflection (TIR) prism.

According to another aspect of the present invention, the laser imager comprises a) a laser light source emitting a first laser beam, b) a first optical system converting the first laser beam to a second laser beam, c) a Grating Light Valve™ comprising reflecting members and a window placed a small distance away from the reflecting members and d) a second optical system comprising a focusing lens for focusing a signal beam modulated by the light valve on the image recording medium. The second optical system comprises a bending element bending the second beam to convert the second beam to the third beam, and the normal to the light valve forms a nonzero angle θxz with the second beam.

In a preferred embodiment of this aspect, the bending element is used to bend the modulated signal beams.

According to still another aspect of the present invention, the laser imager comprises a) a laser light source emitting a laser beam and b) a Grating Light Valve™ comprising reflecting members and a window placed a small distance away from the reflecting members inclined from the first direction to modulate the light beam and c) at least one optical element arranged in the optical path for bending the optical axis of the light beam.

According to the present invention, the laser beam is applied at a desired angle θxz with respect to the GLV™, whereby interference of light can be prevented. The bending element enables the laser beam to hit the light modulator at a relatively small angle.

Accordingly, an object of the present invention is to provide a laser imager capable of preventing creation of etalon fringes on the Grating Light Valve™.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 11A and 11B are model diagrams showing the structure of a recording head according to a third preferred embodiment of the present invention.

DESCRIPTION OF THE PREFERRED EMBODIMENTS

Figure 1:
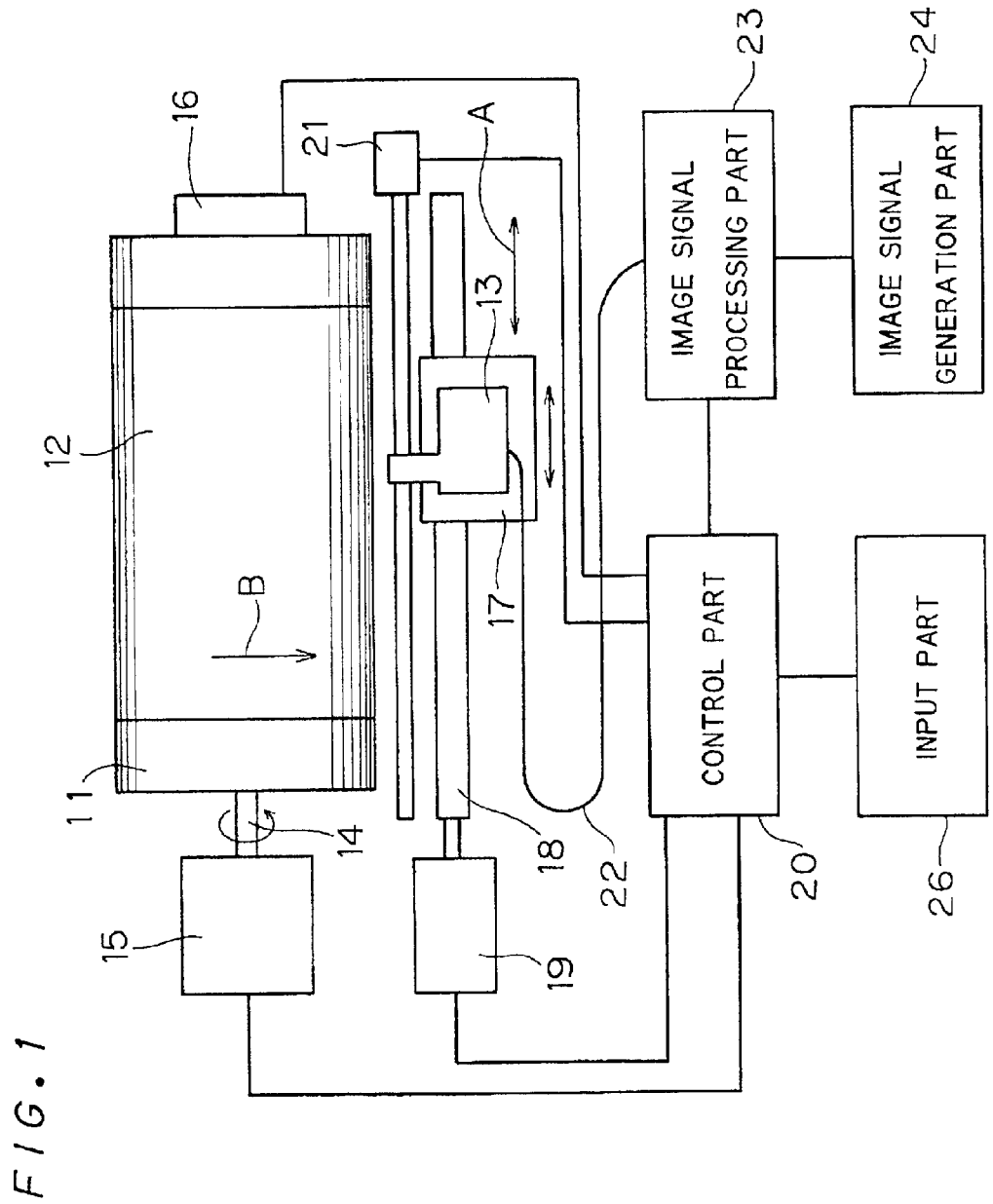
FIG. 1 schematically illustrates a laser imager according to preferred embodiments of the present invention.

FIG. 1 schematically illustrates a laser imager according to a preferred embodiment of the present invention.

This laser imager comprises a drum 11 around which a photosensitive recording medium 12 such as a film or a printing plate is wound and a recording head 13 for applying a modulated laser beam to the recording medium 12 mounted on the drum 11.

The drum 11 is connected to a main scanning motor 15 through a shaft 14. Therefore, the drum 11 is driven by the main scanning motor 15 to rotate about the shaft 14. A rotary encoder 16 monitors the position of the rotational angle of the drum 11.

The recording head 13 is placed on a table 17. The table 17 is connected to a subscanning feeding mechanism 18, comprising a ball screw (not shown) which is further connected with a subscanning motor 19 and a guide member (not shown). Therefore, the recording head 13 is driven by the subscanning motor 19 to reciprocate in the axial direction (subscanning direction shown by arrow A in FIG. 1) of the drum 11. A linear encoder 21 monitors the position of the recording head 13 in the subscanning direction.

The recording head 13 is connected with an image signal processing part 23 through a flexible cable bundle 22. The image signal processing part 23 processes an image signal transmitted from an image signal generation part 24, and thereafter transmits the processed image signal to the recording head 13.

The laser imager further comprises a control part 20 for controlling the overall laser imager. The control part 20 is connected with the main scanning motor 15, the rotary encoder 16, the subscanning motor 19 and the linear encoder 21. The control part 20 is also connected with an input part 26 comprising input means such as a keyboard and display means such as a CRT.

The control part 20 is also connected with the aforementioned image signal processing part 23. The control part 20 controls processing of the image signal in the image signal processing part 23, and transmits a control signal for controlling driving of the recording head 13 to the recording head 13 through the image signal processing part 23 and the flexible cable bundle 22.

This laser imager rotates the drum 11 thereby moving the recording medium 12 in the main scanning direction shown by arrow B in FIG. 1 while moving the recording head 13 in the subscanning direction shown by arrow A. The recording head 13 applies a laser beam modulated in response to the image signal to the recording medium 12, thereby recording a desired image on the recording medium 12.

Figure 2:
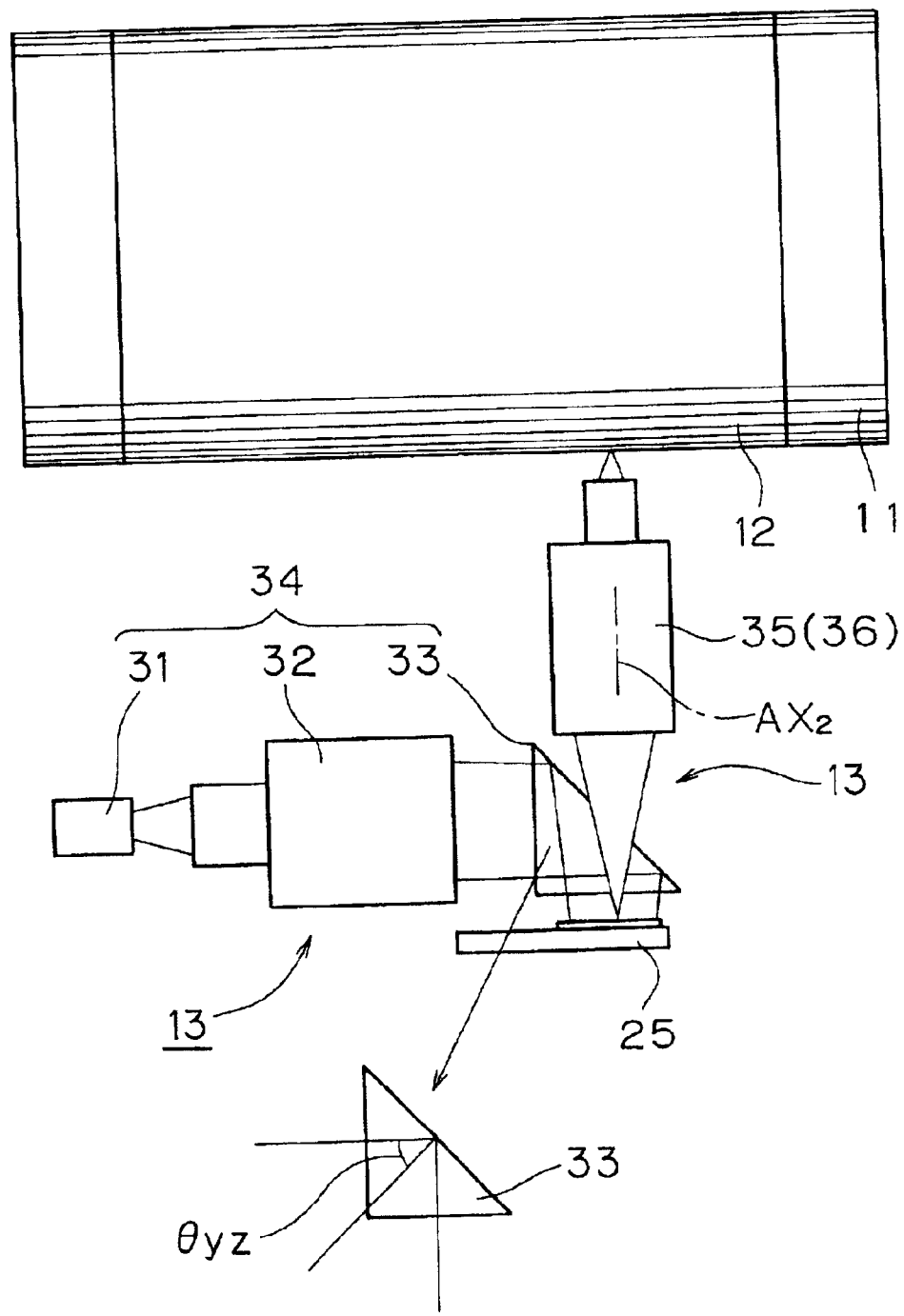
FIG. 2 is a schematic front elevational view showing a principal part of a recording head 13 according to a first preferred embodiment of the present invention along with a drum 11 and a recording medium 12.
Figure 3:
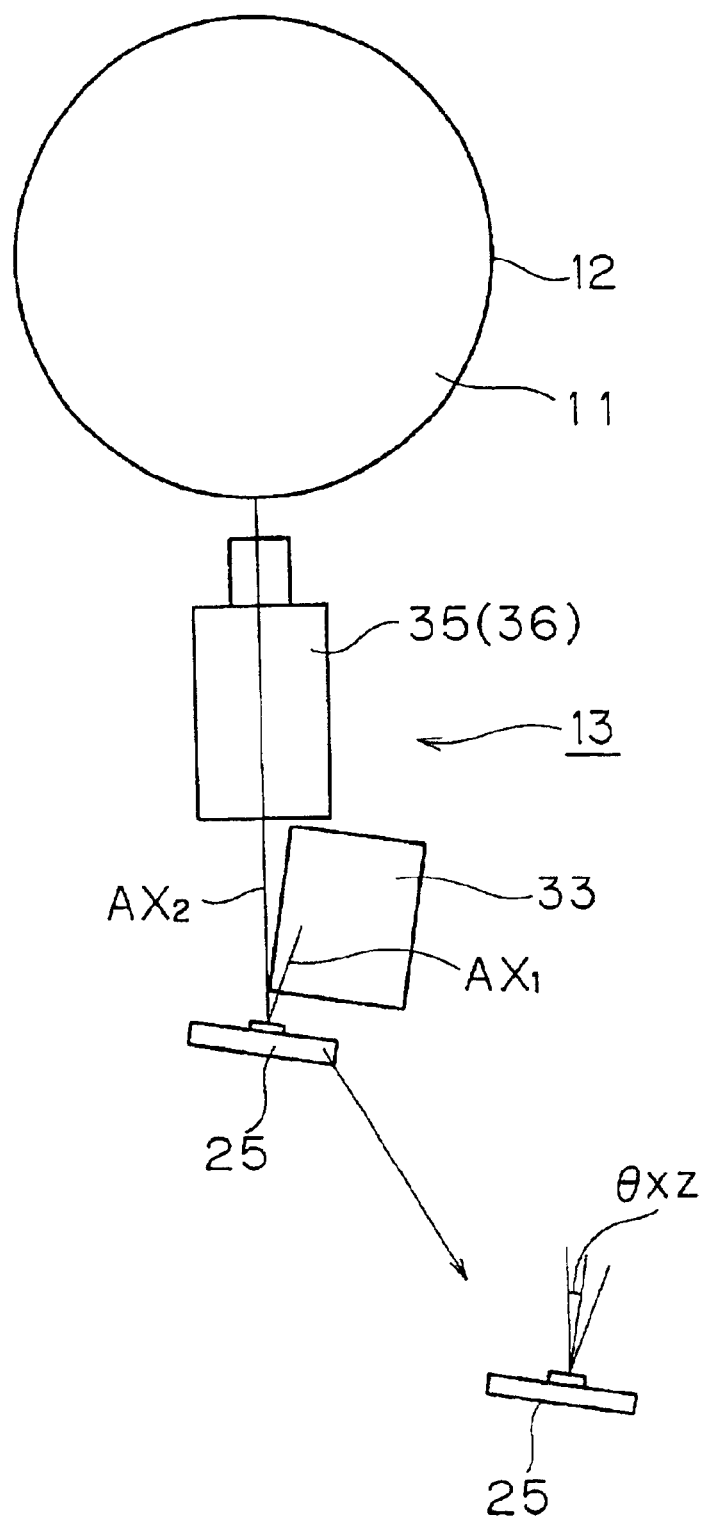
FIG. 3 is a schematic side elevational view showing the principal part of the recording head 13 according to the first preferred embodiment of the present invention along with the drum 11 and the recording medium 12.

The structure of the recording head 13 featuring the present invention is now described. FIG. 2 is a schematic front elevational view showing a principal part of a recording head 13 according to a first preferred embodiment of the present invention along with a drum 11 and a recording medium 12, and FIG. 3 is a schematic side elevational view thereof. FIGS. 2 and 3 show the drum 11 and the recording medium 12 in reduced sizes.

The recording head 13 comprises an illumination optical system 34 formed by a laser light source 31 emitting a laser beam, an illumination lens 32 and a total internal reflection prism 33, a Grating Light Valve™ 25 and a focusing optical system 36 containing a focusing lens 35. The total internal reflection prism 33, the laser light source 31 and the illumination lens 32 align on the same axis.

The laser beam emitted from the laser light source 31 passes through the illumination lens 32, is thereafter reflected by the total internal reflection prism 33 so that the optical path thereof is bent, and applied to the Grating Light Valve™ 25. The laser beam divided into a plurality of beams, which are modulated in the Grating Light Valve™ 25 passes through the focusing lens 35 to be focused on the recording medium 12 mounted on the surface of the drum 11. The optical path can be bent by an optical element other than the total internal reflection prism 33. Such modification as to bending of the optical path is also applicable to a second preferred embodiment of the present invention described later and other examples.

Figure 4:
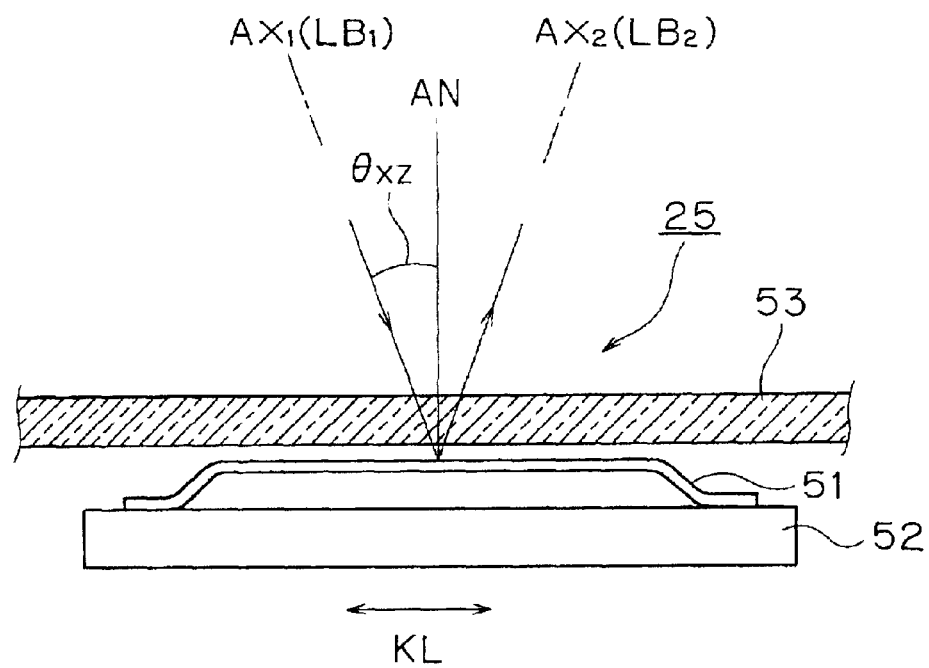
FIG. 4 is a schematic side elevational view showing a principal part of a Grating Light Valve™ 25.
Figure 5:
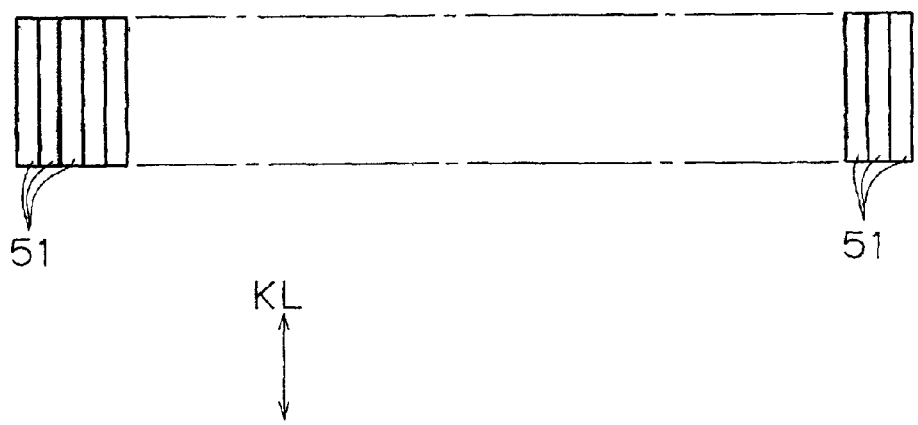
FIG. 5 is a plan view typically showing reflecting members (ribbons) 51 in the Grating Light Valve™ 25.
Figure 6:
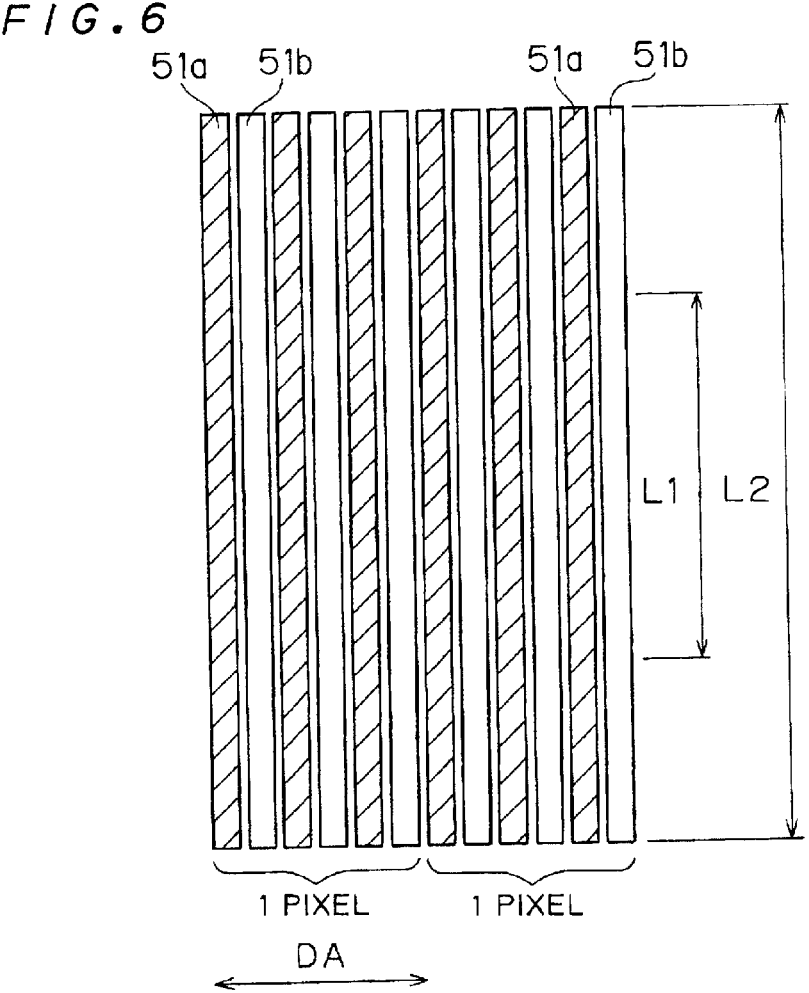
FIG. 6 is a partially enlarged view of FIG. 5.
Figure 7:
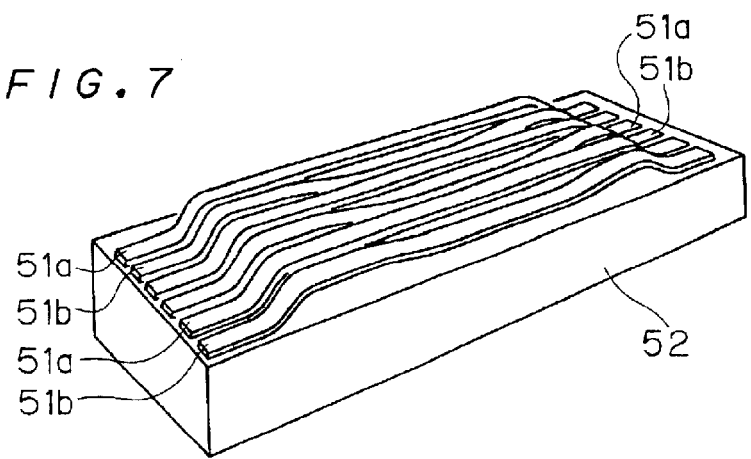
FIG. 7 is a perspective view showing the ribbons 51 for one pixel in the Grating Light Valve™ 25 along with a support part 52.

The structure of the Grating Light Valve™ 25 employed for the recording head 13 is now described. FIG. 4 is a schematic side elevational view showing a principal part of the Grating Light Valve™ 25. FIG. 5 is a plan view typically showing reflecting members (ribbons) 5 in the light valve 25, and FIG. 6 is a partially enlarged view thereof. FIG. 7 is a perspective view showing the ribbons 51 for one pixel in the light valve 25 along with a support part 52.

As shown in FIGS. 4 through 7, the Grating Light Valve™ 25 consists of thousands of ribbons 51 in parallel with each other on the support part 52. A glass window 53 is placed a small distance away from the ribbon surfaces, as shown in FIG. 4.

As shown in FIGS. 6 and 7, the ribbons 51 consist of fixed ribbons 51a and active ribbons 51b. The ribbon length is L2, and the effective length is L1. While the fixed ribbons remain at rest, the active ribbons go down over a small distance when electrical potential is applied, creating a square-well diffraction grating.

Therefore, the Grating Light Valve™ 25 acts as a plane mirror when no voltage is applied, while creating $\pm 1^{st}$ and higher order diffracted beams when voltage is applied.

In the GLV™ 25, the ribbons 51 and the glass window 53 are closely placed in parallel with each other, as shown in FIG. 4. In the prior art, the laser beam is perpendicularly incident upon the GLV™ 25, to result in interference of light between the ribbons 51 and the glass window 53. Such interference of light causes nonuniformity of beam intensity profile on the medium 12.

Therefore, it is desirable that the laser beam is incident upon the GLV™ 25 at a certain non-zero angle to avoid such interference of light. However, the fact that the preferred angle is relatively small makes it difficult to set up the illumination optical system 34 and the focusing optical system 36 so that they will not mechanically interfere with each other.

In order to solve this problem, the recording head 13 according to the first preferred embodiment of the present invention utilizes the total internal reflection prism 33 as part of the illumination optical system 34 for bending the laser beam immediately before it hits the light valve 25 so that the other members of the illumination optical system 34 may be distant from the focusing optical system 36.

This point is described with reference to FIGS. 2 and 3 again.

As shown in FIG. 2, the laser beam emitted from the laser light source 31 passes through the illumination lens 32, to be thereafter incident upon the total internal reflection prism 33 at an incident angle $\theta yz$. The total internal reflection prism 33 bends the laser beam, which is deflected by an angle $2\theta yz$ and thereafter applied to the GLV™ 25. The laser beam divided into a plurality of beams and modulated in the GLV™ 25 is incident upon the focusing lens 35.

The normal AN to the GLV™ 25 forms an angle $\theta xz$ with the optical axis AX1 of the laser beam deflected by the total internal reflection prism 33. Further, the normal AN to the GLV™ 25 forms the angle $\theta xz$ with the optical axis AX2 of the focusing optical system 36.

The incident beam direction AX1 and the reflected beam direction AX2 are on the plan including the normal AN to the GLV™ and the axis KL along the ribbon length. In other words, the plane including the incident beam direction AX1 and the reflected beam direction AX2 is perpendicular to the plane including the normal AN to the GLV™ and the directions in which the incident beam normal to the GLV™ is diffracted.

Although the aforementioned angle θyz can be set to an arbitrary value in the range greater than 0° and less than 90° in principle, use of a total internal reflection prism requires its critical angle to be taken into consideration. When the angle θyz is set to 45°, the overall optical systems 34 and 36 can be readily adjusted.

On the other hand, the aforementioned angle θxz is preferably set to at least 4° and not more than 45°, and more preferably set to at least 4° and not more than 20° under conditions not causing the aforementioned light interference. Too small angle of θxz may fail to avoid etalon fringes, while greater θxz could affect the function of the GLV™.

Figure 8:
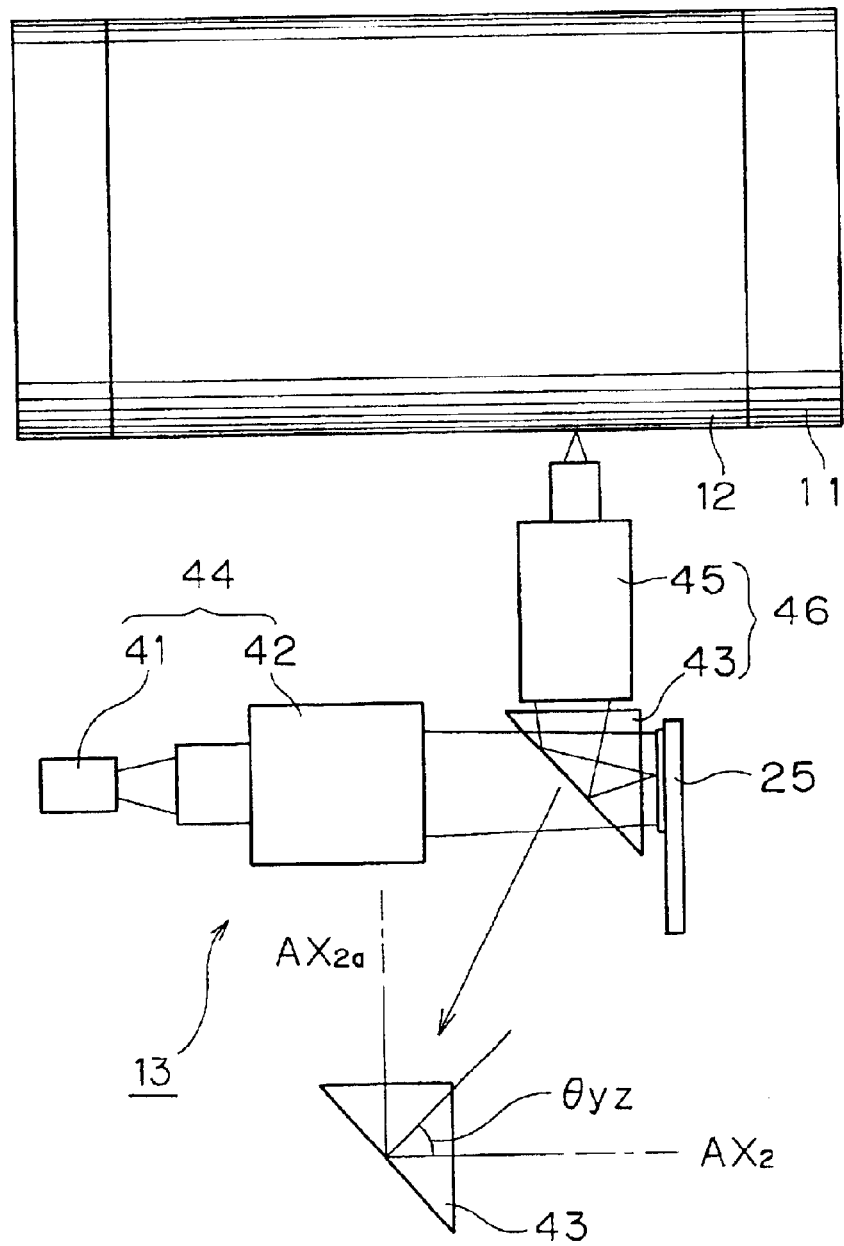
FIG. 8 is a schematic front elevational view showing a principal part of a recording head 13 according to a second preferred embodiment of the present invention along with a drum 11 and a recording medium 12.
Figure 9:
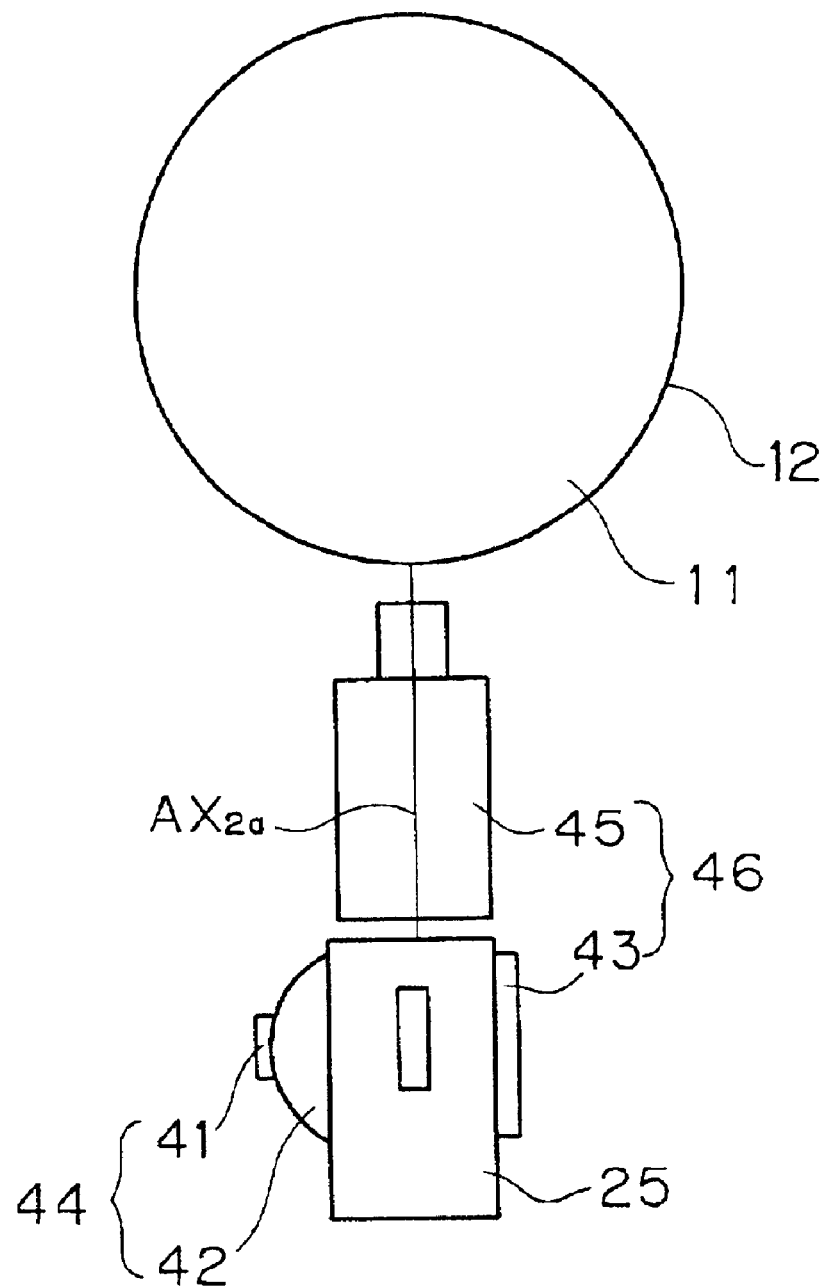
FIG. 9 is a schematic side elevational view showing the principal part of the recording head 13 according to the second preferred embodiment of the present invention along with the drum 11 and the recording medium 12.
Figure 10:
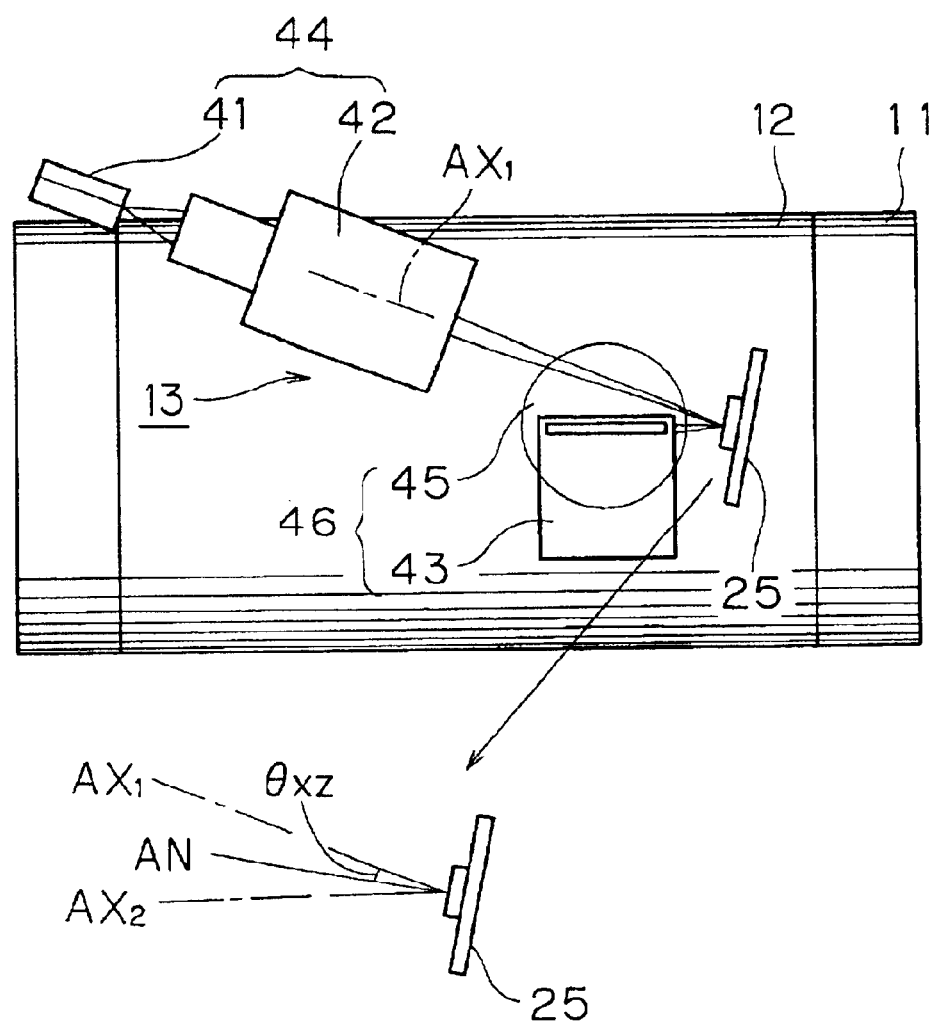
FIG. 10 is a schematic bottom plan view showing the principal part of the recording head 13 according to the second preferred embodiment of the present invention along with the drum 11 and the recording medium 12.

FIG. 8 is a schematic front elevational view shoring a principal part of a recording head 13 according to a second preferred embodiment of the present invention along with a drum 11 and a recording medium 12, FIG. 9 is a schematic side elevational view thereof, and FIG. 10 is a schematic bottom plan view thereof. FIGS. 8 to 10 also show the drum 11 and the recording medium 12 in reduced sizes. Members of the second preferred embodiment identical to those of the aforementioned first preferred embodiment are denoted by the same reference numerals, to omit redundant description.

The recording head 13 comprises an illumination optical system 44 consisting of a laser light source 41 emitting a laser beam and an illumination lens 42, a GLV™ 25 and a focusing optical system 46 comprising a total internal reflection prism 43 and a focusing lens 45, both of which lie on the same axis.

The laser beam emitted from the laser light source 41 passes through the illumination lens 42, and is applied to the Grating Light Valve™ 25. The laser beam is divided into a plurality of beams and modulated by the light valve 25, and then reflected by the total internal reflection prism 43, and thereafter passes through the focusing lens 45 to be focused on the recording medium 12 mounted on the surface of the drum 11.

In the second preferred embodiment, the total internal reflection prism 43 bends the laser beams reflected by the light valve 25.

As shown in FIG. 10, the incident beam direction AX1 forms an angle θxz with the normal AN to the GLV™. Also, the specularly reflected beam direction AX2 forms a same angle with the normal AN to the GLV™.

The aforementioned angle θxz is preferably set to at least 4° and not more than 45°, and more preferably set to at least 4° and not more than 20° under conditions not causing the aforementioned interference, similarly to the first preferred embodiment.

In the second preferred embodiment shown in FIGS. 8 to 10, the tilt angle of the beam arrangement on the medium 12 can be adjusted by rotating the laser light source 41, the illumination lens 42 and the light valve 25 simultaneously.

Figure 11B:
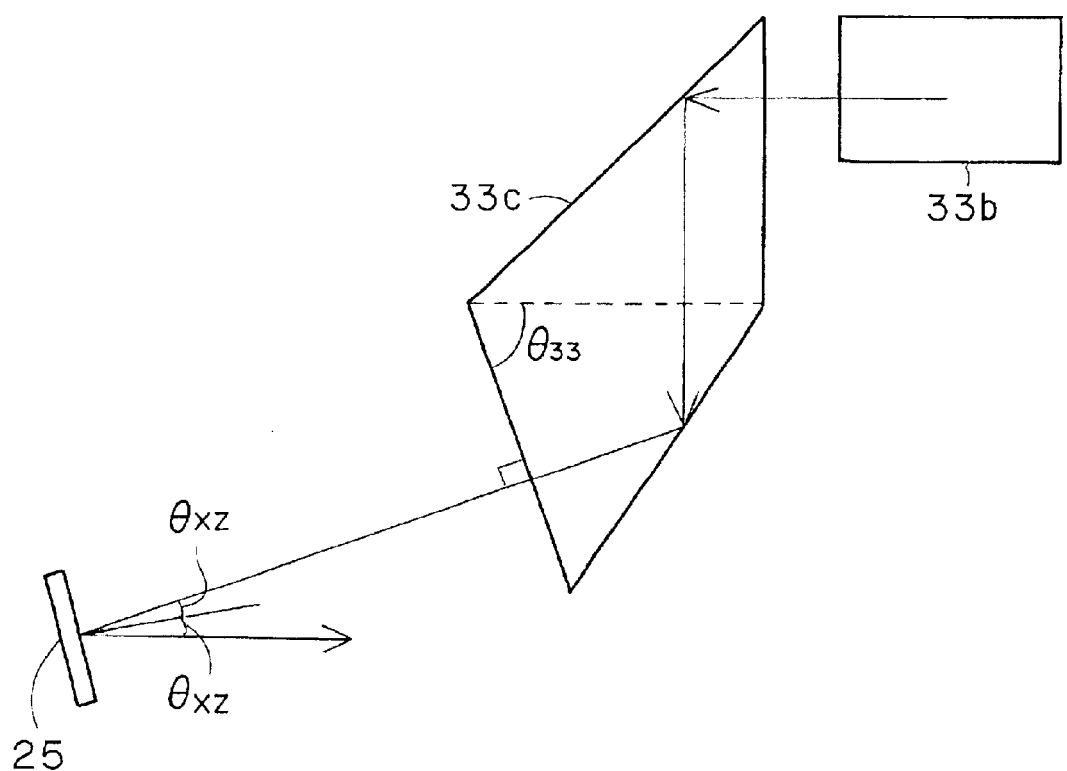

FIGS. 11A and 11B show a third preferred embodiment of the present invention.

In this embodiment, a combination of three prisms 33a to 33c changes the direction of a laser beam emitted from a laser light source 31. The laser beam then hits a Grating Light Valve™ 25 after passing through a lens 32.

The geometrical relations among AX, AX2 and AN are similar to those of the other embodiments.

A laser beam is totally reflected by the prisms 33a and 33b so that it is bent to an angle of 90° in a plane YZ. The laser beam is further bent by the prism 33c in a plane XZ so that it is guided to the GLV™ 25. The incident angle θxz of the laser beam upon the GLV™ 25 is determined based on an angle $θ_{33}$ of the prism 33c. These optical elements arranged in a U-shaped configuration realizes the effective use of the space in an optical head.

The aforementioned preferred embodiments employ the total internal reflection prisms 33, 43, 33a and 33b as bending means. Alternatively, a total internal reflection mirror or the like may be employed as the bending means.

While the invention has been shown and described in detail, the foregoing description is in all aspects illustrative and not restrictive. It is therefore understood that numerous modifications and variations can be devised without departing from the scope of the invention.

What is claimed is:

1. A laser imager for recording an image on an image recording medium, comprising:
   a) a laser light source emitting a first laser beam;
   b) a first optical system converting said first laser beam to a second laser beam;
   c) a reflection type spatial modulator which receives said second laser beam and generates a modulated third beam, said reflection type spatial modulator comprising reflecting ribbons arrayed in parallel and a glass window a small distance away from said reflecting ribbons; and
   d) a second optical system comprising a focusing lens for focusing said third beam on said image recording medium, wherein said first optical system comprises:
   a bending element bending said first laser beam to convert said first laser beam to said second laser beam, and
   an optical axis of said second laser beam incident onto said reflection type spatial modulator forms a nonzero angle θxz with the normal to the reflection type spatial modulator, whereby interference between first optical reflection at said reflecting ribbons and second optical reflection at said window glass is substantially prevented.

2. The laser imager according to claim 1, wherein said first optical system further comprises: a lens placed between said laser light source and said bending element.

3. The laser imager according to claim 2, wherein said angle θxz is at least 4° and not more than 20°.

4. The laser imager according to claim 3, wherein said bending element comprises a total internal reflection prism.

5. A laser imager for recording an image on an image recording medium, comprising:
   a) a laser light source emitting a first laser beam;
   b) a first optical system converting said first laser beam to a second laser beam;
   c) a reflection type spatial modulator which receives said second laser beam and generates a modulated third beam, said reflection type spatial modulator comprising reflecting ribbons arrayed in parallel and a glass window a small distance away from said reflecting ribbons; and
   d) a second optical system for converting said third beam to a fourth light beam focused on said image recording medium, wherein said second optical system comprises:
   a bending element bending said third laser beam to convert said third beam to said fourth laser beam, and
   an optical axis of said second laser beam incident onto said reflection type spatial modulator form a nonzero angle θxz with the normal to the reflection type spatial modulator, whereby interference between first optical reflection at said reflecting ribbons and second optical reflection at said window glass is substantially prevented.

6. The laser imager according to claim 5, wherein said angle θxz is at least 4° and not more than 20°.

7. The laser imager according to claim 6, wherein said bending element comprises a total internal reflection prism.

8. A laser imager for recording an image on an image recording medium, comprising:

a) a laser light source emitting a laser beam; and b) an optical system, changing an optical axis direction of said light beam for focusing said light beam on said image recording medium, comprising:

b-1) a reflection type spatial light modulator comprising a reflection part and a protective glass member arranged on said reflection part for receiving said light beam in a first direction and reflecting said light beam in a second direction inclined from said first direction to modulate said light beam, and b-2) at least one optical element arranged in an optically serial order with said spatial light modulator for bending the optical axis direction of said light beam, wherein an inclination angle between said first and second directions is established to substantially prevent interference between first optical reflection at said reflection part and second optical reflection at protective glass member.

9. The laser imager according to claim 8, wherein said at least one optical element comprises a prism.

10. The laser imager according to claim 9, wherein said light beam reaches said spatial light modulator via said at least one optical element.

11. The laser imager according to claim 9, wherein said light beam is reflected by said spatial light modulator and thereafter incident upon said at least one optical element.

* * * * *